United States Patent [19]
Lawhorne et al.

[11] Patent Number: 5,527,469
[45] Date of Patent: Jun. 18, 1996

[54] METHOD FOR THE PREPARATION OF DESULFURIZED TITANIUM OXIDE HYDROLYSATE OF HIGH PURITY

[76] Inventors: Earl R. Lawhorne, 13 Lufburrow Way, Savannah, Chatham County, Ga. 31411; Woodford R. Brown, Jr., 9128 Brighton Place, Savannah, Chatham County, Ga. 31406

[21] Appl. No.: 488,169

[22] Filed: Jun. 12, 1995

[51] Int. Cl.$^6$ ................................................. C01G 23/047
[52] U.S. Cl. ........................... 210/710; 210/772; 423/82; 423/83; 423/610; 423/615; 423/616
[58] Field of Search ................................ 423/82, 83, 610, 423/615, 616; 210/772, 710

[56] References Cited

U.S. PATENT DOCUMENTS

| | | | |
|---|---|---|---|
| 2,253,595 | 8/1941 | Wood | 423/615 |
| 2,361,987 | 11/1944 | Booge et al. | 423/615 |
| 2,771,345 | 11/1956 | Tanner, Jr. | |
| 3,518,053 | 6/1970 | Kolznak et al. | 423/615 |
| 3,658,539 | 4/1972 | Dantro. | |
| 4,364,908 | 12/1982 | Rahm et al. | 423/615 |
| 4,988,495 | 1/1991 | Wiederhöft et al. | 423/615 |
| 5,011,666 | 4/1991 | Chao et al. | 423/82 |
| 5,094,834 | 3/1992 | Wiederhöft et al. | 423/615 |
| 5,229,087 | 7/1993 | Schultz et al. | 423/615 |
| 5,409,679 | 4/1995 | Hartmann | 423/615 |

*Primary Examiner*—Neil McCarthy
*Attorney, Agent, or Firm*—Deveau, Colton & Marquis

[57] ABSTRACT

A titanium oxide hydrolysate slurry prepared by the sulfate process is treated with either an alkali metal hydroxide or an alkali metal carbonate to solubilize the sulfur bound to the titanium at a temperature of from 60° C. to 120° C. and the slurry is treated with an organic acid to remove the alkali metal compounds present. This process produces titanium oxide hydrolysate of high purity.

19 Claims, 1 Drawing Sheet

METHOD FOR THE PREPARATION OF DESULFURIZED TITANIUM OXIDE HYDROLYSATE OF HIGH PURITY

BACKGROUND OF THE INVENTION

1. Field of the Invention

This invention relates generally to a method for removing metallic and sulfur impurities and other impurities from titanium oxide hydrolysate at atmospheric pressure and at a temperature of from 60° C. to 120° C. so that it can be used in the preparation of various titanates and catalysts which require low levels of impurities in the formulations. The sulfur bound to the titanium oxide hydrolysate is removed and replaced by more volatile impurities which are easily removed in low temperature calcination.

The sulfate process for the production of titanium dioxide results in the production of a titanium iron sulfate liquor. A titanium oxide hydrolysate slurry can be precipitated from this liquor. This slurry will have various metallic impurities (e.g. iron) and free sulfuric acid. These can largely be removed with repeated washing with water.

However, the titanium oxide hydrolysate slurry may contain up to 2% sulfur (S) by weight in the form of sulfuric acid or sulfate ion which is either chemically bound to or adsorbed by the titanium oxide hydrolysate. Repeated washing of the titanium oxide hydrolysate slurry has very little or no effect on the sulfuric acid or sulfate ion which is either chemically bound to or adsorbed by the titania.

Sulfur present in the titanium oxide hydrolysate slurry will be driven off by heating at high temperature. However, using high temperatures presents the problem of emissions of sulfur and various sulfur containing compounds into the atmosphere. This requires the utilization of some type of device to prevent these sulfuric compounds from going into the atmosphere. The preferred method is to remove all of the impurities in the titanium oxide hydrolysate slurry at relatively low temperatures in order to save energy.

Ammonium compounds can be used to remove the sulfur after the washing of the titanium oxide hydrolysate slurry. The ammonia can be removed at low temperature because of the relatively high volatility of ammonia. However, introducing the ammonia into the atmosphere is also objectionable from an environmental standpoint.

The use of chlorine containing compounds and the use of compounds which produce metal cationic impurities are also objectionable, because they are not volatilized at relatively low temperatures and are pollutants and may enter into reaction with components which are combined with the titanium oxide hydrolysate.

2. Prior Art

U.S. Pat. No. 2,771,345, issued on Nov. 20, 1956 to Tanner discloses a process for the preparation of titanium dioxide pigments. It discloses a process for removing metallic and phosphatic impurities from titania hydrolysate prior to calcination into titanium dioxide. The titania hydrolysate is first digested in water with an alkali which converts the phosphatic impurities to a water-soluble condition. Water washing is used to remove the soluble phosphatic impurities. The titania hydrolysate is then treated with a strong mineral acid, such as sulfuric acid, to restore it to a flocculated state. The mineral acid removes the sodium impurities, but does introduce other impurities. For example, when sulfuric acid is used, sulfur impurities are added to the titania hydrolysate. It is then calcined at high temperatures to titanium dioxide.

U.S. Pat. No. 3,658,539 issued on Apr. 25, 1972 to Dantro discloses the use of ammoniacal compounds to prepare titanium dioxide powder. In this process, a titanium sulfate-iron sulfate solution is hydrolyzed to form hydrous titanium dioxide. It is then filtered, bleached, and washed to remove the soluble iron salt. An aqueous slurry is made of the hydrous titanium oxide and treated with a sufficient amount of an ammoniacal compound to raise the pH to at least 6.0. The neutralized hydrous oxide is then washed to remove the ammonium sulfate formed. The hydrous oxide is then dried to form soft aggregates of crystals of titanium dioxide. Ammoniacal compounds used are ammonium hydroxide, ammonium carbonates and ammonia gas. The Dantro process was designed to reduce the sulfur content through the reaction of the hydrous titanium oxide with the ammoniacal compound. The Dantro process does result in some ammonium salt remaining as an impurity in the titanium dioxide.

U.S. Pat. No. 5,011,666, issued on Apr. 30, 1991 to Chao et al. discloses a process for purifying $TiO_2$ ore which can be used to make pigment or titanium metal. Chao et al. purifies the $TiO_2$ ore by subjecting it to leaching treatments which involve alternating between the use of a mineral acid and an aqueous solution of an alkali metal compound. This treatment is designed to solubilize the iron, alkali metal, alkaline earth metal, rare earth metals, aluminum, phosphorous, thorium, uranium, chromium, manganese, silicon, vanadium, and yttrium impurities. These leaching processes have to be conducted at a temperature, pressure and time sufficient to solubilize the mineral impurities. Elevated temperatures and/or pressures are necessary. These impurities form a leachate which can be removed from the ore and washed with water. His process is not designed to drive off any sulfur that may be present, but rather the impurities named above.

BRIEF SUMMARY OF THE INVENTION

It is an object of this invention to develop a method for preparing titanium oxide hydrolysate with a very low impurity content which is useful as a raw material in the preparation of titanates and catalysts.

Titanium oxide hydrolysate can be prepared by the sulfuric acid digestion of a titaniferrous raw material. This process produces a titanium iron sulfate liquor from which a titanium oxide hydrolysate can be precipitated. Titanium oxide hydrolysate normally has a high sulfur content. Free sulfuric acid and soluble sulfur compounds can be removed by washing and filtration of the slurry. Some sulfur compounds in the form of either sulfuric acid or sulfate ion are either chemically bound to or adsorbed by the titanium oxide hydrolysate. The bound sulfur which cannot be substantially reduced by washing with water will remain with the titanium oxide hydrolysate at a concentration of about 2%. This is too high a concentration for most catalyst and titanate preparation applications. It is generally preferred that the sulfur content be less than 500 ppm.

It is an object of this invention to develop a method for removing the sulfur from the titanium oxide hydrolysate without substituting into the titanium oxide hydrolysate other objectionable compounds or ions (e.g. such as chloride ions or alkali metal cations) which are undesirable in titanate and catalyst preparation.

It is is a further object of this invention to avoid the use of ammonia in removing the sulfur impurities from the titanium oxide hydrolysate because of the environmental problems posed by ammonia.

It is a further object of this invention to carry out the preparation at atmospheric pressure and at a temperature generally less than the boiling point of the titanium oxide hydrolysate slurry.

It has been found that these objects can be attained by mixing an alkali metal hydroxide or alkali metal carbonate with an aqueous slurry of the titanium oxide hydrolysate so as to solubilize bound sulfur impurities in the titanium oxide hydrolysate. From about 0.1 to 2 parts by weight of the alkali metal hydroxide or the molecular equivalent of akali metal carbonate is used per part by weight of the $TiO_2$ equivalent in the titanium oxide hydrolysate while maintaining the temperature of the slurry between 60° C. and 120° C.

Filtration and water-washing are used to remove the alkali-solubilized impurities including the sulfur containing compounds and any excess alkali metal hydroxide. The slurry is then mixed with a water soluble organic acid with the pH being lowered to less than about 6. The slurry can then be filtered and washed with water to remove the acid-solubilized impurities, in particular the alkali metal salts. The resulting titanium oxide hydrolysate has a very low impurity content and is useful as a raw material in the preparation of titanates and catalysts. If the titanium oxide hydrolysate were to be calcined, the organic acids would be decomposed into products of low toxicity, mainly, carbon dioxide and water vapor. These impurities may be volatilized during calcination at relatively low temperatures.

These objects, and other objects, features and advantages of the present invention will become more apparent to one skilled in the art when the following detailed description of the invention is read.

BRIEF DESCRIPTION OF THE DRAWING OF THE PREFERRED EMBODIMENT

FIG. 1 is a flow chart showing the various steps for removing the impurities from titanium oxide hydrolysate.

DETAILED DESCRIPTION OF THE INVENTION

Figure 1:
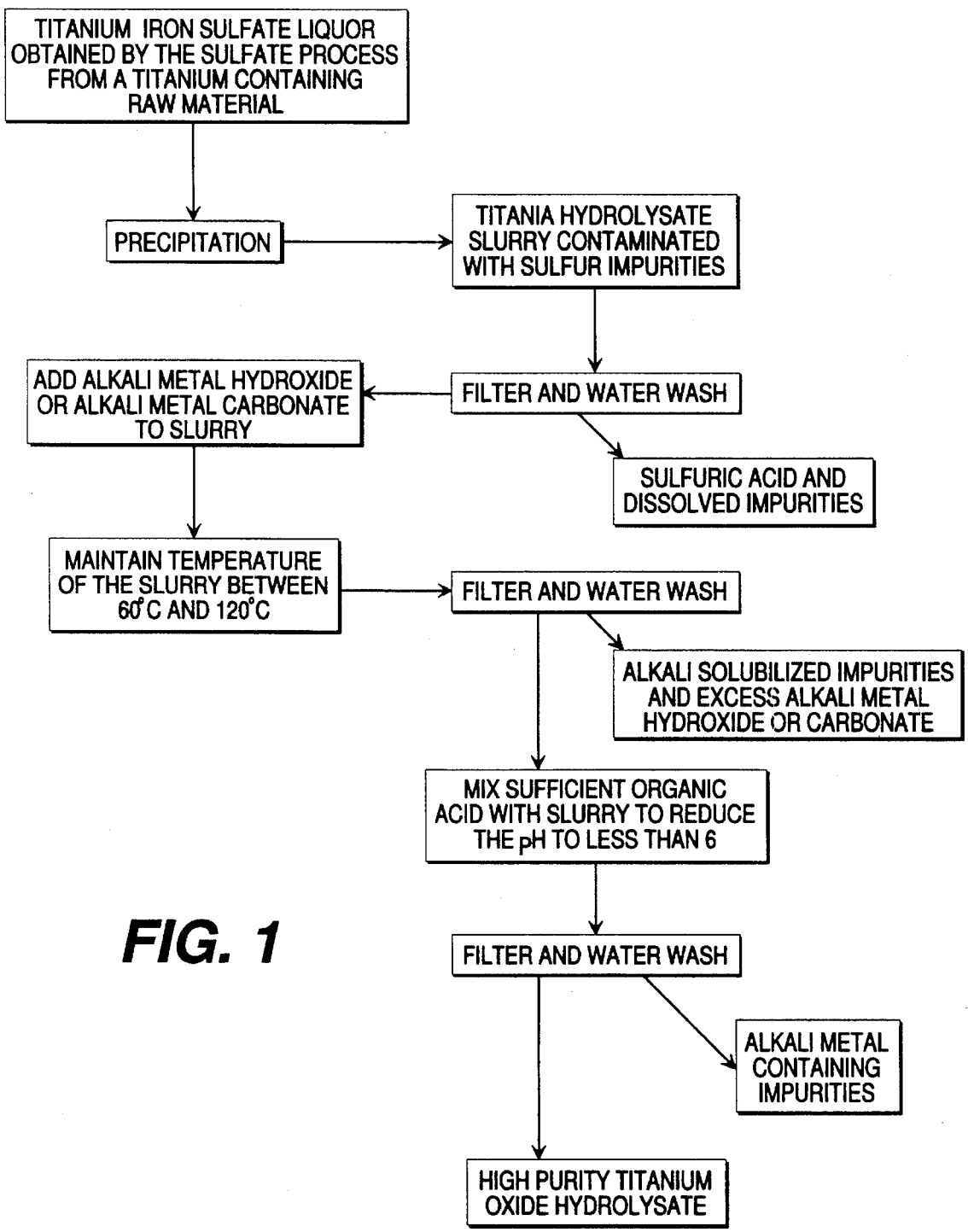

This invention is especially useful in purifying titanium oxide hydrolysate prepared by the sulfuric acid digestion of titaniferous raw material. This process produces a titanium iron sulfate liquor from which a titanium oxide hydrolysate can be precipitated. Extensive washing and filtration of the hydrolysate will remove the dissolved metallic impurities and free sulfuric acid. The slurry solids may contain from 5 to 10% sulfuric acid or sulfate ion which is either chemically bound to or adsorbed by the titanium oxide hydrolysate. This bound sulfur can be removed by calcination at high temperature. However, the resulting sulfur oxides must be controlled by some device to prohibit their emission into the atmosphere. If the sulfur is removed by calcination, the resulting titania compound is crystalline $TiO_2$ which is less reactive than titanium oxide hydrolysate, has a larger particle size, a lower surface area and is less dispersible. Consequently, the crystalline $TiO_2$ is not very satisfactory for the preparation of titanates and catalysts.

The bound sulfur impurities of the titanium oxide hydrolysate can be removed through using an alkali metal hydroxide or alkali metal carbonate which is mixed with a slurry of the titanium oxide hydrolysate in an amount from about 0.1 to 2 parts by weight of an alkali metal hydroxide or the molecular equivalent of an akali metal carbonate.

Hydroxides or carbonates of the alkali metals (e.g. sodium, potassium, and lithium) are suitable. Sodium hydroxide is preferred.

The alkali metal hydroxide or alkali metal carbonate solubilizes the bound sulfur impurities. While from about 0.1 to 2 parts by weight of an alkali metal hydroxide or the molecular equivalent of an akali metal carbonate can be used. It is preferred that from 0.25 to 1.5 parts by weight of an alkali metal hydroxide be used or the molecular equivalent of an alkali metal carbonate.

The temperature of the titanium oxide hydrolysate slurry can be increased or maintained between 60° C. and 120° C. during the process. Generally, the temperature of the slurry should be maintained at a sufficient level for a sufficient time to solubilize the bound sulfur compounds and sulfate ions. Preferably a temperature between 70° C. and 120° C. is used. It has been found that the preferred time for aging the slurry is from thirty (30) minutes to one (1) hour. It is not necessary to pressurize the slurry during the process.

The alkali-treated titanium oxide hydrolysate slurry is filtered and washed with water to remove the alkali solubilized impurities, especially the sulfate ions. It is also desirable to remove the excess alkali metal hydroxide or alkali metal carbonate during this filtration and washing process because these impurities are as equally undesirable as are sulfur impurities in the preparation of titanates and catalysts. The alkali metal ions can be removed from the alkaline slurry by using a water soluble organic acid which is mixed with the slurry to lower the pH. Alkali metal may be present in the slurry as an alkali metal titanate or other compound. The preferred organic compounds are carboxylic acids, such as acetic acid, and polycarboxylic acids such as citric acid.

It is necessary that the pH be lowered to less than about 6 and preferably to 4.5 or less.

Basically, the amount of acid that is added is that amount necessary to solubilize the impurities, especially the alkali metal containing impurities. The acidic slurry is then washed and filtered to remove the solubilized impurities.

In using the alkali metal hydroxide or alkali metal carbonate to solubilize the impurities, it is necessary that they be solubilized "substantially." This means the amount of alkali metal hydroxide or alkali metal carbonate used and the temperature and time of the reaction in the slurry is sufficient to solubilize a high percentage of the impurities present. Of course, the subsequent filtering and water washing steps require the removal of substantially all of the alkali solubilized impurities. The use of the organic acid and the filtering and water washing steps also require that the impurities, especially the alkali metal containing impurities, are substantially solubilized and removed.

The steps of this method are set forth in FIG. 1 which is a flow diagram of the process of this invention.

Once these impurities have been removed, the titanium oxide hydrolysate can be used to produce titanates and catalysts. If the titanium oxide hydrolysate were to be calcined, the organic acids and their reaction products can be volatilized at relatively low temperatures and produce mainly carbon dioxide and water which can safely be emitted into the atmosphere. The decomposition products of the organic acids have little or no toxicity.

The following examples illustrate this invention.

EXAMPLE 1

A titanium oxide hydrolysate slurry was taken from the processing stream in the production of titanium dioxide being produced by the sulfate process. The slurry was taken from the process after precipitation from the titanium iron sulfate liquor followed by extensive washing to remove dissolved metallic impurities and free sulfuric acid. This slurry was further washed extensively to remove dissolved metallic impurities and free sulfuric acid. The resulting cake was then placed in a glass dish and dried in an oven at 110° C. The sulfur content of the cake was 1.9% by weight.

EXAMPLE 2

A titanium oxide hydrolysate slurry was taken from the processing stream in the production of titanium dioxide being produced by the sulfate process. The slurry was taken from the process after precipitation from the titanium iron sulfate liquor followed by extensive washing to remove dissolved metallic impurities and free sulfuric acid.

The titanium content of this slurry is a poorly defined mixture of titanium hydroxide (or orthotitanic acid) and titanium oxide compounds. This slurry contains from 5 to 10% of sulfuric acid which is chemically combined with the titanium oxide and titanium hydroxide compounds in addition to the water of hydration. The titanium dioxide equivalent of this slurry is typically about 30% by weight.

A portion of this slurry containing 400 grams of $TiO_2$ equivalent was heated to about 65° C. and added to 1200 grams of 50% NaOH solution (150% NaOH based on contained $TiO_2$ equivalent) which has been preheated to about 100° C. The temperature of the mixture increased to 120° C. but dropped to 110° C. after all the slurry was added. The slurry was aged for two hours at 105° to 110° C. and then cooled to about 70° C. before filtering and washing the resulting cake with hot water to remove most of the excess NaOH. Water was added to the filter cake to produce a slurry to which glacial acetic acid was added to adjust the pH to about 4.5. The slurry was then stirred for one hour at 60° C. The slurry was re-filtered and the resulting cake washed with several displacements of hot water. The cake was then placed in a glass dish and dried in an oven at 110° C. The sulfur content of the dried cake was about 50 parts per million by weight.

EXAMPLE 3

A titanium oxide hydrolysate slurry was taken from the processing stream in the production of titanium dioxide being produced by the sulfate process. The slurry was taken from the process after precipitation from the titanium iron sulfate liquor followed by extensive washing to remove dissolved metallic impurities and free sulfuric acid.

The titanium content of this slurry is a poorly defined mixture of titanium hydroxide (or orthotitanic acid) and titanium oxide compounds. This slurry contains from 5 to 10% of sulfuric acid which is chemically combined with the titanium oxide and titanium hydroxide compounds in addition to the water of hydration. The titanium dioxide equivalent of this slurry is typically about 30% by weight.

A portion of this slurry containing 300 grams $TiO_2$ equivalent was diluted with water to a total volume of 3000 ml and heated to 75° C. This slurry was added to 150 grams of a 50% NaOH solution containing 75 grams of NaOH (25% NaOH based on contained $TiO_2$ equivalent). The resulting batch was stirred for two hours and then filtered, washed, and reslurried. Glacial acetic acid was added to adjust the pH to about 4.5. The batch was then stirred for one hour at 60° C. and re-filtered with the resulting cake being washed with several displacements of hot water. The cake was then placed in a glass dish and dried in an oven at 110©C. The sulfur content of the dried cake was about 100 parts per million by weight.

EXAMPLE 4

A titanium oxide hydrolysate slurry was taken from the processing stream in the production of titanium dioxide being produced by the sulfate process. The slurry was taken from the process after precipitation from the titanium iron sulfate liquor followed by extensive washing to remove dissolved metallic impurities and free sulfuric acid.

The titanium content of this slurry is a poorly defined mixture of titanium hydroxide (or orthotitanic acid) and titanium oxide compounds. This slurry contains from 5 to 10% of sulfuric acid which is chemically combined with the titanium oxide and titanium hydroxide compounds in addition to the water of hydration. The titanium dioxide equivalent of this slurry is typically about 30% by weight.

In this example the effect upon final sulfur content was determined by varying the amount of NaOH used (the ratio of NaOH to $TiO_2$ by weight), aging temperature and time during desulfurization. The quantity of the slurry in each batch containing the amount of $TiO_2$ equivalent as set forth in Table I below was heated to about 65° C. and then added to a NaOH solution with the parts of NaOH per part of $TiO_2$ equivalent by weight as indicated in Table I. Each batch was aged at the aging temperature and for the aging time set forth in Table I. Each batch was then filtered and the resulting cake was washed with hot water to remove most of the excess NaOH. The filter cake was then reslurried in water and glacial acetic acid was added to adjust the pH to about 4.5. Each batch was then stirred for one hour at 60° C. and re-filtered. The resulting cake was washed with several displacements of hot water. The cake was then placed in a glass dish and dried in an oven at 110° C. The sulfur and sodium content in parts per million of the final product was then determined. The results of this are set forth in Table I.

As illustrated by the results obtained with Batch 8, it is clear that the best results in removing sulfur are obtained by increasing the aging temperature and time. Sodium titanate is formed when the NaOH is added to the slurry. The addition of acetic acid causes the decomposition of most of the sodium titanate and most of the sodium ions are removed by washing. The sodium ions in Batch 8 can be further reduced by additional washing.

TABLE I

| Batch | Equiv. $TiO_2$ Conc. in Slurry | Parts NAOH per part of $TiO_2$ by weight | Aging Temp. | Aging Time | PPM of sulfur in Final Product | PPM of sodium in Final Product |
| --- | --- | --- | --- | --- | --- | --- |
| 1. | 100 g/L | 0.1 | 85° C. | 1 hr. | 480 | 255 |
| 2. | 100 g/L | 0.25 | 85° C. | 1 hr. | 260 | <190 |

TABLE I-continued

| Batch | Equiv. TiO$_2$ Conc. in Slurry | Parts NAOH per part of TiO$_2$ by weight | Aging Temp. | Aging Time | PPM of sulfur in Final Product | PPM of sodium in Final Product |
| --- | --- | --- | --- | --- | --- | --- |
| 3. | 200 g/L | 0.25 | 85° C. | 1 hr. | 190 | 293 |
| 4. | 200 g/L | 0.50 | 85° C. | 1 hr. | 130 | <190 |
| 5. | 200 g/L | 0.25 | 70° C. | 0 | 270 | <190 |
| 6. | 200 g/L | 0.25 | 85° C. | 2 hrs. | 170 | <190 |
| 7. | 200 g/L | 0.50 | 70° C. | 0 | 170 | <190 |
| 8. | 200 g/L | 0.50 | 85° C | 2hrs. | 110 | 450 |

EXAMPLE 5

A titanium oxide hydrolysate slurry was taken from the process stream in the production of titanium dioxide via the sulfate process. This slurry was taken at a point after precipitation from the titanium iron sulfate liquor followed by extensive water washing to remove most of the dissolved metallic impurities and free sulfuric acid.

The titanium content of this slurry is a poorly defined mixture of titanium hydroxide (or orthotitanic acid) and titanium oxide compounds. This slurry contains from 5 to 10% sulfuric acid which is chemically combined with the titanium oxide and titanium hydroxide compounds along with water of hydration. The titanium dioxide equivalent of this slurry is about 30% by weight.

(A) A portion of slurry containing titanium oxide hydrolysate equivalent to 300 grams titanium dioxide was treated by adding a sodium hydroxide (NaOH) solution equivalent to 150 grams NaOH. This is 50% NaOH based upon TiO$_2$ equivalent. The slurry was diluted to 1500 ml total volume, heated to 70° C., and held with stirring for one hour. The slurry was then filtered and washed with hot (60°) distilled water to remove solubilized alkali metal salts and excess sodium hydroxide. The washed filter cake was then reslurried and treated with 100 ml of glacial acetic acid. The slurry was agitated one hour and washed with hot (60°) distilled water. The washed cake was then dried in an oven at 110° C. The dried filter cake was crushed in mortar and pestle before evaluation. Sulfur (S) content was 0.016% based on dried sample weight.

(B) A similar portion of the same slurry was treated with the molecular equivalent amount of sodium carbonate (199 grams) instead of sodium hydroxide and processed in the same mariner. The sulfur (S) content of the dried product was 0.059% based on dried sample weight.

(C) Another similar sized portion of this same base slurry was treated with the molecular equivalent amount of potassium carbonate (259 grams) instead of sodium hydroxide and then processed in the same manner. The sulfur (S) content of the dried product was 0.047% based upon dry sample weight.

EXAMPLE 6

A titanium oxide hydrolysate slurry was taken from the processing stream in the production of titanium dioxide being produced by the sulfate process. The slurry was taken from the process after precipitation from the titanium iron sulfate liquor followed by extensive washing to remove dissolved metallic impurities and free sulfuric acid.

The titanium content of this slurry is a poorly defined mixture of titanium hydroxide (or orthotitanic acid) and titanium oxide compounds. This slurry contains from 5 to 10% of sulfuric acid which is chemically combined with the titanium oxide and titanium hydroxide compounds in addition to the water of hydration. The titanium dioxide equivalent of this slurry is typically about 30% by weight.

Sixty (60) gallons of titanium oxide hydrolysate slurry were taken from the processing stream. This slurry contained about 180 pounds TiO$_2$ equivalent based on weight. The slurry was transferred into a reactor and 36 liters of a NaOH solution (33% NaOH based on contained TiO$_2$ equivalent) was added. The slurry was heated to about 85° C. for about one hour and then allowed to cool to 70° C. before filtration. The slurry was filtered and then washed and pressed into a cake using a filter press. The cake was then reslurried into the reactor and glacial acetic acid was added to neutralize the alkaline cake. Filtration and washing was carried out using the same filter press as for the first filtration step. The final filter cake contained an average of 41.4% TiO$_2$ equivalent. The sulfur content was 187 ppm on the basis of contained TiO$_2$ equivalent. The sodium ion content was about 0.1% on the basis of contained TiO$_2$ equivalent.

The detailed description of a preferred embodiment and Examples disclosed above are for a illustrative purposes only and are not intended to limit the scope and equivalents of the invention, which is defined by the following claims.

What is claimed:

1. A method for the purification of titanium oxide hydrolysate containing bound sulfur impurities, which comprises:

(1) mixing a compound selected from the group consisting of an alkali metal hydroxide and alkali metal carbonate with an aqueous slurry of said hydrolysate in an amount from about 0.1 to 2 parts by weight of the alkali metal hydroxide per part by weight of the TiO$_2$ equivalent or at the molecular equivalent of an alkali metal carbonate in said hydrolysate while maintaining the temperature of the slurry between 60° C. and 120° C.;

(2) filtering and water-washing said alkali-treated hydrolysate slurry thereby removing the alkali-solubilized impurities, including sulfur containing compounds and excess alkali metal hydroxide;

(3) mixing a water soluble organic acid with the slurry to reduce the pH to less than about 6; and (4) filtering and water-washing said acid treated slurry thereby removing the acid solubilized impurities including alkali metal containing impurities.

2. The method of claim 1 in which the compound used in step (1) is an alkali metal hydroxide and which is present in an amount from about 0.25 to 1.5 parts by weight of the hydroxide per part by weight of the TiO$_2$ equivalent and the temperature of the slurry is maintained between 70° C. and 120° C.

3. The method of claim 2 in which the alkali metal hydroxide used in step (1) is sodium hydroxide.

4. The method of claim 1 in which the organic acid used in step (3) is a carboxylic acid.

5. The method of claim 2 in which the pH of the slurry used in step (3) is reduced to at least about 4.5.

6. The method of claim 3 in which the organic acid used in step (3) is acetic acid.

7. The method of claim 3 in which the organic acid used in step (3) is citric acid.

8. The method of claim 1 in which the compound used in step (1) is an alkali metal carbonate.

9. The method of claim 8 in which the alkali metal carbonate is sodium carbonate.

10. The method of claim 8 in which the alkali metal carbonate is potassium carbonate.

11. A method for the purification of a titanium oxide hydrolysate containing bound sulfur impurities, which comprises:

(1) mixing a compound selected from the group consisting of an alkali metal hydroxide and an alkali metal carbonate with an aqueous slurry of said hydrolysate in an amount from about 0.1 to 2 parts by weight of alkali metal hydroxide per part by weight of the $TiO_2$ equivalent or the molecular equivalent of an alkali metal carbonate in said hydrolysate while maintaining the temperature of the slurry for a time which is sufficient to solubilize substantially all of the bound sulfur impurities;

(2) filtering and water-washing the alkali-treated hydrolysate slurry thereby removing substantially the alkali-solubilized impurities, including sulfur containing compounds and excess alkali metal hydroxide;

(3) mixing a non-chlorine containing water soluble organic acid with the slurry to reduce the pH to a sufficient acidic level to solubilize the alkali metal containing impurities; and (4) filtering and water-washing said acid treated slurry thereby substantially removing the acid solubilized impurities including alkali metal containing impurities.

12. The method of claim 11 in which the compound used in step (1) is an alkali metal hydroxide.

13. The method of claim 12 in which the alkali metal hydroxide is sodium hydroxide.

14. The method of claim 11 in which the organic acid used in step (3) is a carboxylic acid.

15. The method of claim 11 in which the organic acid used in step (3) is acetic acid.

16. The method of claim 11 in which the organic acid used in step (3) is citric acid.

17. The method of claim 11 in which the compound used in step (1) is an alkali metal carbonate.

18. The method of claim 17 in which the alkali metal carbonate is sodium carbonate.

19. The method of claim 17 in which the alkali metal carbonate is potassium carbonate.

* * * * *

UNITED STATES PATENT AND TRADEMARK OFFICE
CERTIFICATE OF CORRECTION

PATENT NO. : 5,527,469
DATED : June 18, 1996
INVENTOR(S) : Lawhorne, Earl R, Brown, Woodford R., Jr.

It is certified that error appears in the above-indentified patent and that said Letters Patent is hereby corrected as shown below:

On the title page; item [73]

Assignee: Kemira Pigments, Inc.

Signed and Sealed this

Sixth Day of May, 1997

*Attest:*

BRUCE LEHMAN

*Attesting Officer*     Commissioner of Patents and Trademarks